United States Patent Office 3,382,124
Patented May 7, 1968

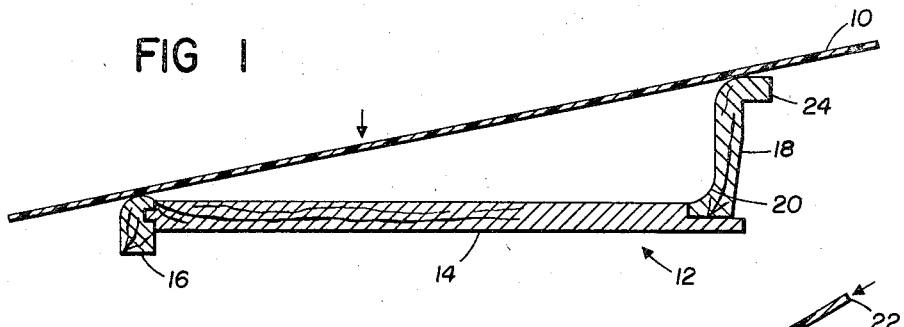
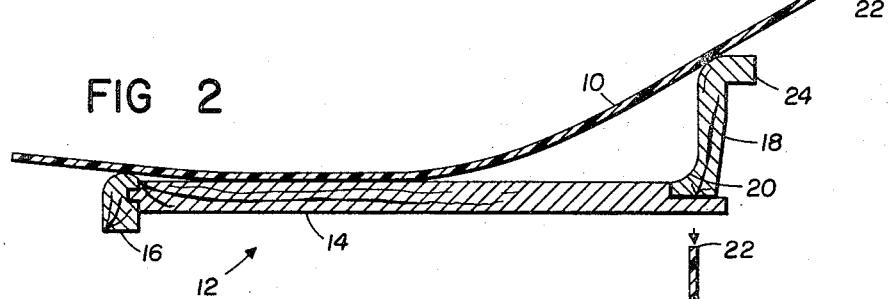
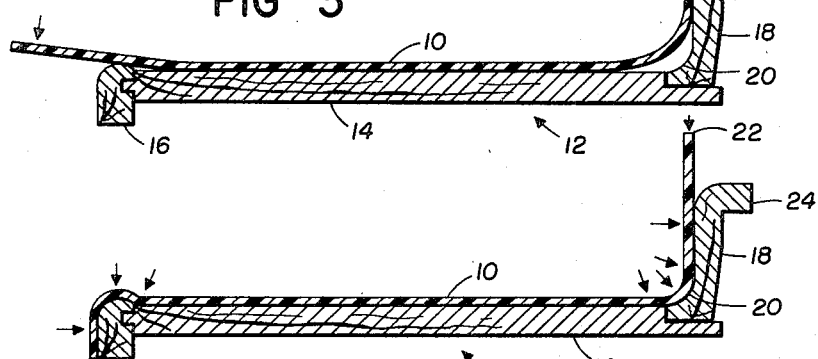
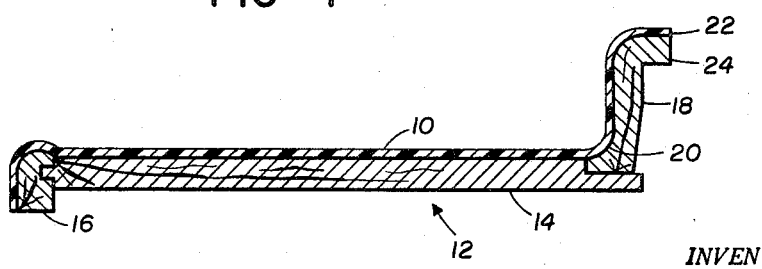
INVENTOR.
CLARENCE BRISKEY

3,382,124
CONTINUOUS METHOD FOR APPLYING PLASTIC MATERIAL TO A PREFORMED CORE
Clarence Briskey, 701 10th Ave., Coralville, Iowa 52240
Filed June 18, 1965, Ser. No. 465,037
9 Claims. (Cl. 156—202)

ABSTRACT OF THE DISCLOSURE

A method for applying a plastic surfacing material to a preformed countertop base by forming said material to said base continuously from end to end of said base.

---

This invention relates to a method for applying surfacing material to a preformed backing or core and more particularly relates to a continuous method for applying a thermosetting sheet material to a core or backing which is preformed to a shape suitable for a counter top or the like having a backsplash portion.

What is commonly referred to as thermosetting sheet material consists generally of a suitable backing sheet impregnated with a thermosetting resin such as melamine formaldehyde or the like. This sheet material is extensively used as a surfacing material on table tops, counter tops, cabinets, etc., and is available commercially under such familiar trade names as "Formica," "Panelite," "Micarta," "Conolite" and others. The material provides a decorative surface as well as a highly stain resistant and, within limits, a heat resistant surface that is extremely easy to clean and maintain. It is supplied in relatively thin sheets which must be applied to a base or, as it is sometimes called, a "core" of the desired size and shape. The combination of the core and sheet material therefore provides both a decorative and a structurally rigid article.

The counter tops most commonly used in the present-day construction of kitchens, laboratories, etc., have a downwardly curved front edge and a backsplash that is integrally formed with the top along its entire rear edge. The surfacing sheet material must therefore be applied to a core which ultimately has this configuration and, preferably, the sheet is applied so as to provide a continuous unbroken surface. Because of the difficulty in properly forming the thermosetting sheet material and applying it to the core, and because the construction requires special equipment to properly heat and form the material, counter tops of this type are generally factory made rather than built on the site. The core is commonly made of wood or wood composition material, and in all prior art processes konwn to me, the core is formed or made up in sections and applied to the surfacing material at different stages during formation of the surfacing material to the final shape. In a typical process, flat sections of backing material are first applied to the surfacing material in those areas which will be flat in the final article. Heat is then applied to the thermosetting surfacing material in the areas which are to be formed to other than straight sections thereby allowing the material to be bent without cracking or breaking. In the preferred counter top construction previously referred to, the front edge, the area or "cove" between the main surface and backsplash, and the area along the top edge of the backsplash are curved sections. Therefore, the sheet material is heated and bent to the configuration of the final article, and after cooling, curved sections of the core are applied to these curved areas. In U.S. Patent No. 2,648,370, issued Aug. 11, 1953 to W. I. Beech, a typical process of this type is disclosed in which the core is made in sections that are applied separately to the surfacing material after it has been formed to the desired finished shape. This and other similar prior art methods are not continuous and require numerous steps and relatively large and expensive dies and handling equipment to form a final high quality product that is free from defects, such as cracks, in the surfacing material.

U.S. Patent No. 2,804,909, issued Sept. 3, 1957 to F. Hammer, discloses another example of a similar method in which the core is made of a single piece of metal that is formed to the final desired shape simultaneously with formation of the surfacing material. Obviously, this method cannot be used to manufacture the more common counter top which has a core made of wood, nor is it continuous.

Where cabinet tops of considerable length are being manufactured by these and the other prior art methods known to me, it is obvious that the necessary forming and handling equipment is qiute large and expensive. Therefore, as a practical matter, counter tops exceeding twelve feet in length cannot be manufactured with a continuous, unbroken surface. There is known to me one prior art method for continuously forming the down-curved front edge of the counter top by rolling it onto the core. However, because of the many difficulties in forming the surfacing material to the shape of a counter top having a backsplash, this portion of the top still must be constructed piecemeal by the existing noncontinuous methods described above. Moreover, even in carefully performed noncontinuous methods, small cracks sometimes develop in the surfacing material, or space sometimes remains between the surfacing material and the core with the result that the final product is inferior in quality. These defects occur mainly because of the inherent nature of the noncontinuous methods in which the wooden core is made and applied to the surfacing material in sections. Also, as previously indicated, the length of counter tops producible by the noncontinuous methods is limited by the practical consideration of providing dies and presses large enough to form and handle long sheets of the surfacing material.

It is, therefore, a principal object of the invention to provide a continuous method for applying thermosetting sheet material to a preformed core.

It is another object of the invention to provide an improved and continuous method for the manufacture of counter tops or the like which have a backsplash portion and a single piece of thermosetting surfacing material applied to and covering the entire surface.

It is a further object of the invention to provide an improved and continuous method for the manufacture of counter tops or the like having a plastic surfacing material bonded to a preformed core, which method enables the manufacture of a counter top of any desired length.

It is a further object of the invention to provide an improved method for the manufacture of counter tops or the like by continuously applying and forming a sheet of thermosetting surfacing material to a preformed core in a manner that greatly minimizes the possibility of cracking the surfacing material in those areas where it is formed to the curved portions of the core.

It is a further object of the invention to provide an improved method for the manufacture of counter tops or the like of the type having a thermosetting surfacing material which method will reduce the manufacturing cost of producing such tops.

It is another object of the invention to provide a continuous method for applying thermosetting plastic surfacing material to a preformed core having curved portions, which method can be conducted on relatively inexpensive equipment and which is not dependent upon the skill of the operator to any large degree.

These and other objects of the invention will be readily apparent from a consideration of the following description of a preferred embodiment taken in connection with the accompanying drawing in which:

FIGS. 1 to 4 are end sectional views of the surfacing material and core showing these components of a counter top in progressive stages of fabrication; and FIG. 5 is an end sectional view of a completed counter top.

It will be understood from the description that the method is a continuous one and the figures of the drawing are merely illustrative of the approximate relative positions of the components during certain selected stages of fabrication.

Referring to the drawing, reference numeral 10 designates a relatively thin sheet of thermosetting surfacing material which initially is flat and commonly consists of a suitable absorbent base impregnated with a thermosetting resin, such as melamine formaldehyde resin or the like. The thermosetting sheet material 10 can be bent or formed to the desired shape of a counter top if sufficient heat is first applied to the resinous surface. At normal room temperature, however, the sheet 10 can be bent only a limited amount, beyond which the hard resinous surface will crack. Thermosetting sheet material of this type is available commercially in many colors and decorative patterns under trade names such as "Formica," "Panelite," "Micarta" and others. This material is both stain and heat resistant and provides a very durable and attractive surface when applied to walls and furniture of various kinds, particularly desk and table tops, and is widely used for kitchen, bathroom and laboratory counter tops. Since this invention is directed primarily to counter tops suitable as work surfaces in kitchens, bathrooms, laboratories and the like which preferably have a backsplash, there must be provided a backing or core to give structural strength and rigidity to the sheet material 10. A core of this type having a backsplash is indicated generally by the reference numeral 12 in the drawings. The prior art discloses many different noncontinuous methods for making counter tops in which the core or backing is applied to the sheet material in sections after the material has been formed to the desired final shape. In my novel method, the core 12 can be completely formed to the desired finished shape prior to application of the surfacing material. As opposed to the prior art methods, such a method has many manufacturing advantages, as will appear from the description hereinafter.

The core 12 is made in three sections: a long, flat center section 14; a downwardly curved front edge section 16 which extends along the center section 14; and a somewhat S-shaped backsplash section 18, one portion of which forms the concave "cove" section 20, the other curved portion forming the curved top edge 24 as shown. For ease of construction, the core sections 14, 16 and 18 are formed to the cross-sectional shapes shown using overlapping and interlocking joints and are fitted together and held in place by suitable adhesive to form the solid core 12.

Sheets of thermosetting material are presently commerically available in various widths and in lengths up to twelve feet. Since my novel method is a continuous one, there is no limit practically to the length of sheet which can be handled. In the noncontinuous methods of the prior art in which the thermosetting sheet material is heated and pressed into shape, obviously the size of the press and dies used practically limit the size of sheet that can be handled. To start the method, a sheet of thermosetting sheet material 10 is cut to a width and length corresponding to the peripheral dimensions of the preformed core 12 to which it is to be bonded. Adhesive is applied to the surfaces to be joined by brushing or spraying it on the backside of the sheet 10 and on the top surfaces of the core 12, that is, the surfaces to which the sheet 10 will be bonded. The adhesive used is of the contact cement type which must be applied to the surfaces to be bonded and permitted to dry before further handling of the material. With this type of adhesive, a first surface to which the adhesive has been applied will not stick to a second surface unless the adhesive has also been applied to the second surface. However, if contact adhesive is applied to both surfaces of two parts to be joined and if the adhesive is dry, the surfaces immediately adhere upon contact and the parts cannot be moved or separated except by the application of considerable force. Even then, the material may fail before the adhesive bond is broken. Adhesives of this type permit easy handling of the core 12 and sheet 10 after the adhesive has been applied and allowed to dry. However, extreme care must be exercised to assure that before the surfaces are permitted to come into contact the core 12 and sheet 10 are accurately positioned. Another advantage of the so-called contact type adhesives is that no curing is required after the surfaces are joined. On the other hand, heat-curable adhesives, which require curing or drying in order to form a bond, make it difficult to handle the articles to which the adhesive has been applied since the surfaces must be joined while the adhesive is "wet." Moreover, such adhesives require a period of curing or drying subsequent to joinder of the surfaces. Since heat must be applied to the sheet material 10 in order to form it to the shape of the core 12, heat-curable cements would tend to become cured before the surfaces are joined and an adequate and complete bond between the surfaces might not be formed. This type of adhesive is therefore not satisfactory for use in a continuous method where one of the components to be joined must progressively be formed and simultaneously bonded to the other component.

After the contact-type adhesive has been applied to the entire back surface of the sheet material 10, and after it has been applied over the entire upper surfaces of the core 12, the adhesive is allowed to dry. Drying time varies depending upon the type of adhesive used and the temperature and humidity of the ambient air. Of course, drying time can be greatly decreased by the use of heat and/or blowers. After the adhesive surfaces are sufficiently dry, the sheet material 10 is positioned on the core 12 in the manner indicated in FIG. 1 with the adhesive surfaces facing. This can be done with the aid of suitable guides to assure proper relative positioning of the components. When the sheet 10 and core 12 are properly positioned, force is applied to engage the adhesive surfaces along the entire length of the flat center section 14 of core 12. The sheet material 10 is thus immediately bonded to the core 12 thereby positively holding them in the proper position for the remaining steps of the process. Of course, in order to achieve this bond, the sheet material 10 must be bent to a certain degree as indicated in FIG. 2. However, this amount of bending can be accomplished without the application of heat and without the danger of cracking the plastic resinous surface on the sheet 10.

Since the method is a continuous one that can be performed by conveying the sheet 10 and core 12 at a substantially constant speed through suitable apparatus, I have found that the application of force progressively along the back edge 22 of the sheet 10 generally coplanar with the remaining straight portion of the sheet 10 is very effective to commence formation of the sheet 10 to the concave curvature of the backsplash 18 in the area of the cove 20. To allow bending of the sheet 10 without cracking, heat is applied to the sheet 10 in the area that is to form the cove 20 to raise the temperature of the resinous surface above the point where the sheet becomes pliable. The heat can be applied by any suitable means, such as radiant heaters properly positioned along the path of travel of the sheet through the forming apparatus. While the sheet 10 is heated, force is gradually and continuously applied to the back edge 22 of the sheet 10 in the general direction of the arrow shown in FIG. 2. Relative movement between the sheet 10 and core 12 is essential in a continuous method where the sheet is being progressively formed and bonded to the shape of the preformed core. Some means must therefore be provided to allow for this relative movement. Preventing direct contact between the sheet 10 and core 12 until the sheet is formed to the final shape is possible but is very difficult to accomplish and requires complex apparatus. In my novel method, the application of heat to the sheet 10 in the area that is to form the cove 20 also serves to "deactivate" the adhesive on the undersurface of the sheet 10 in this area. In other words, the adhesive will not form an immediate bond upon contact with the adhesive on the core 12, and the heat also softens the adhesive in this area of the sheet 10 which permits the sheet 10 to slide or slip along the surface of the top edge 24 of the core 12. Thus, as force is continuously applied to the back edge of the sheet 10, and because of the existing bond between the sheet 10 and the core 12 all along the center section 14 of the core 12, the sheet 10 will be formed to the shape of cove 20 of the backsplash 18 taking the general shape indicated in FIG. 3 of the drawing. Continued application of force to the edge 22 of the sheet 10 will eventually force the sheet 10 into contact with the entire cove area of the core 12. However, to assure the best possible bond between the sheet 10 and core 12 in the area of the cove 20, I prefer to apply force directly to the sheet 10 in the area of the cove 20 before the sheet 10 cools and the adhesive becomes again activated. This can be done very easily by means of rollers properly positioned to engage the sheet 10 in the concave area of the cove 20 as the sheet 10 and core 12 are slowly but continuously moved through the forming apparatus. Also, force by rollers or otherwise can be simultaneously applied to form the bond along the vertical straight portion of the backsplash 18. At about this time, the application of heat in the area of the cove 20 is discontinued, thereby permitting the adhesive to become "active" again and an adequate bond to form while force is still being applied.

With sheet 10 now bonded to the core 12 in the area of the cove 20 and also along the vertical surface of the backsplash 18, heat is now applied to the sheet 10 along its back edge in the area that is to be formed around the top edge 24 of the core 12. Force is then continuously and gradually applied, by rollers or otherwise, to shape the sheet 10 around the top edge 24 of the backsplash portion 18 of the core 12. After thus forming the sheet 10, the application of heat is discontinued and the force maintained for a short period of time while the sheet 10 cools and the adhesive therefore becomes sufficiently activated to form the bond that will hold this portion of the sheet and core together.

While the above steps are being performed, formation of the sheet 10 to the shape of the core 12 along the front edge 16 can also be accomplished. This is also done continuously by first applying heat and then force in a downwardly and inwardly direction to gradually and continuously bend the sheet 10 to the shape of the core 12 along the front edge 16. Here again, sufficient force should be progressively applied while the sheet 10 is pliable and for a short time during cooling until the resinous material has permanently set. This assures a complete bond between all areas of contact of the sheet 10 and core 12. As previously indicated with respect to the formation of the sheet 10 to the backsplash 18, this progressive and continuous application of force is accomplished preferably by the use of a series of properly positioned and aligned rollers or by other suitable means. The shaping of the sheet 10 to the core 12 along the front edge 16 can be accomplished separately or simultaneously with formation of the remainder of sheet 10 to conform to the core 12 along the backsplash portion. The formation of the sheet 10 along the front edge 16 is relatively simple to accomplish, in a continuous process, because the bend is in one direction only and does not require a reverse bend as in the area of the backsplash.

As previously mentioned, the steps of my new and improved method are performed continuously by moving the sheet 10 and core 12 together through apparatus of any suitable design which will accomplish the method. Properly positioned and aligned series of rollers can be used very effectively to gradually and continuously apply the necessary forces to form the sheet 10 to the configuration of the core 12. The most difficult part of manufacturing counter tops of the type illustrated is the formation of the sheet 10 to conform to the shape of the core 12 along the backsplash 18. Obviously, this is a very difficult procedure as indicated by the long standing practice in the industry to manufacture these tops by noncontinuous methods in which the core is applied to the sheet in sections, as generally described in U.S. Patent No. 2,648,370, issued Aug. 11, 1953 to W. I. Beech. As indicated previously, such methods have many disadvantages including the practical limitation on the length of the tops that can be manufactured. Also, when using these prior art methods, the possibility is greater of creating dead air spaces or areas where the material 10 and core 12 have not been bonded. This is, of course, undesirable since cracks can form in these areas. My improved method using progressive, continuous steps overcomes these disadvantages and produces a product of even higher quality than can be produced by the prior art noncontinuous methods. Because of the shape of the core in the area of the backsplash requiring formation of the plastic sheet material to a somewhat S shape, the continuous method has been thought not to be practical. However, because of my method, the manufacture of tops by a continuous method is not only now practical but has many advantages over the noncontinuous methods and produces a superior product. By the application of heat and the application of forces in the directions and in the manner described, thermosetting sheet material can now be effectively and easily applied and bonded to preformed cores of the general shape shown and described herein as well as to other similar shapes. It is obvious that various revisions and modifications can be made in the individual steps of my novel method and in their sequence, but it is my intention that any such revisions and modifications which are obvious to those skilled in the art will be included within the scope of the following claims.

I claim:

1. A continuous method for applying a flat sheet of thermosetting material to a preformed core having a flat longitudinally extending section with an upwardly extending back edge that forms a cove, said method comprising the steps of: applying contact cement to the surfaces of said sheet and core to be joined; allowing the cement to dry on said surfaces; positioning the sheet on the core with said surfaces facing; bonding the sheet to the core along at least a portion of the flat section of said core by contacting the respective cemented surfaces and applying force in the area to be joined; applying heat to said sheet in the area of the sheet that is to form the cove thereby to provide for bending of said sheet in the heated area and to deactivate the cement in that area; gradually applying force to the said sheet from end to end longitudinally to progressively form it to the contour of the core; and allowing the sheet and core to cool while maintaining force thereon in the heated area.

2. A continuous method for applying a flat sheet of thermosetting material to a preformed core having a flat longitudinally extending center section with a backsplash extending upwardly and longitudinally along the entire rear edge of said core, said method comprising the steps of: applying contact cement to the surfaces of the sheet and the core to be joined; allowing the cement on said surfaces to dry; joining and bonding the said sheet to the core longitudinally along at least a portion of said center section in front of said backsplash; applying heat to said sheet in the area that is to form the backsplash; gradually bending said sheet progressively along its length to form it to the contour of the core; and allowing the sheet and core to cool while applying sufficient force to maintain the surfaces of said sheet and core in contact until bonded.

3. A continuous method for applying a flat, thin sheet of thermosetting material to a preformed core of uniform cross-section throughout its length and having a longitudinally extending center portion with a flat top surface joined by a cove to an upwardly extending portion along one longitudinal edge of said center portion, said method comprising the steps of: applying contact-type cement to the surfaces of said sheet and said core to be joined; allowing the cement on said surfaces to dry; positioning the sheet with respect to the core with said cemented surfaces facing each other; bonding said sheet to said core along the center portion of the core by engaging the respective cemented surfaces thereof and applying force to said sheet and core; applying heat to said sheet in the area thereof that is to form the cove and upwardly extending portion thereby providing for bending of said sheet in the heated area and providing for deactivation of the cement in that area; gradually applying force lengthwise along the longitudinal edge of said sheet adjacent the heated area thereby sliding the unbonded portion of said sheet over the top of the upwardly extending portion and bending said sheet until it conforms to and engages said cove; discontinuing the application of heat; and continuing the application of force to said sheet in the heated area while allowing the sheet and core to cool sufficiently to become bonded together.

4. A continuous method for applying a flat, thin sheet of thermosetting material to a preformed core of uniform cross-section throughout its length and having a longitudinally extending center portion with a flat top surface joined by a cove to an upwardly extending portion along one longitudinal edge of said center portion, said method comprising the steps of: applying contact-type cement to the surfaces of said sheet and said core to be joined; allowing the cement on said surfaces to dry; positioning the sheet with respect to the core with said cemented surfaces facing each other; bonding said sheet to said core along the center portion of the core by engaging the respective cemented surfaces thereof and applying force to said sheet and core; applying heat to said sheet in the area thereof that is to form the cove and upwardly extending portion thereby providing for bending of said sheet in the heated area and providing for deactivation of the cement in that area; gradually applying force along the longitudinal edge of said sheet adjacent the heated area thereby sliding the unbonded portion of said sheet over the top of the upwardly extending portion and bending said sheet until it conforms to and engages said cove; progressively applying force longitudinally to the sheet in the area of the cove; discontinuing the application of heat; and continuing the application of force to said sheet in the heated area while allowing the sheet and core to cool sufficiently to become bonded together.

5. A continuous method for applying a flat sheet of thermosetting plastic material to a preformed core having a flat section with an upwardly extending backsplash along the back edge, the flat section and backsplash being joined by a cove, said method comprising the steps of: applying contact cement to the surfaces of said sheet and the core that are to be joined; allowing the cement on said surfaces to dry; positioning the sheet on said core with the cemented surfaces facing; joining the sheet and bonding it to the core along at least a portion of the flat section of said core; moving said sheet and core together lengthwise at a substantially constant speed along a substantially straight path; passing said sheet adjacent to heating means to heat said sheet in the area that is to be joined to said cove; progressively and gradually causing the application of force to said sheet as it moves along said path to form said sheet to the shape of said core in the area of said cove; and maintaining the application of said force until said sheet has cooled sufficiently to become bonded to said core.

6. The continuous method of claim 5 in which the force applied to said sheet is applied along the edge of said sheet as said sheet moves along said path.

7. The continuous method of claim 6 in which said force is applied generally co-planar with the then unbonded portion of said sheet.

8. A continuous method for applying a flat, thin sheet of thermosetting material to a preformed core of uniform cross-section throughout its length and having a longitudinally extending center portion with a downwardly curved front edge and a flat top surface joined by a cove to an upwardly extending backsplash portion along the rear longitudinal edge of said center portion, said method comprising the steps of: applying contact-type cement to the undersurface of said sheet and the top surfaces of said core to be bonded to said sheet; allowing the cement on said surfaces to dry; positioning the sheet with respect to the core with said cemented surfaces facing each other; bonding said sheet to said core along the center portion of the core by engaging the respective cemented surfaces thereof and applying force to said sheet and core along the center portion; applying heat to said sheet in the area thereof that is to form the cove and backsplash portion thereby providing for bending of said sheet in the heated area and providing for deactivation of the cement in that area; gradually and progressively applying force lengthwise along the longitudinal back edge of said sheet in a direction generally co-planar with the remaining unbonded portion of said sheet thereby sliding the unbonded portion of said sheet over the backsplash portion and bending said sheet until it conforms to and contacts said cove; progressively applying force lengthwise to the sheet in the area of the cove; applying heat to said sheet in the area thereof that is to form said front edge; gradually and progressively applying force lengthwise along the edge of said sheet that is to be bonded to the front edge of said core; discontinuing the application of heat to said sheet; and continuing the application of force to said sheet in the heated areas while allowing said sheet and core to cool sufficiently to become bonded together.

9. The continuous method of claim 8 in which the heating and forming of the sheet to the front edge of the core takes place substantially simultaneously with the heating and forming of the sheet to the backsplash portion of the core.

References Cited

UNITED STATES PATENTS

| | | | |
|---|---|---|---|
| 3,296,052 | 1/1967 | Bechtold | 156—202 |
| 2,804,909 | 9/1957 | Hammer | 156—212 |

EARL M. BERGERT, *Primary Examiner.*

D. SCHWARTZ, R. KILLWORTH, *Assistant Examiners.*